United States Patent [19]

Proksa et al.

[11] Patent Number: 5,312,596
[45] Date of Patent: May 17, 1994

[54] MIXHEAD FOR MIXING AT LEAST TWO FREE-FLOWING REACTION COMPONENTS

[75] Inventors: Ferdinand Proksa, Leverkusen; Hans-Michael Sulzbach, Königswinter; Ferdinand Althausen, Neunkirchen, all of Fed. Rep. of Germany

[73] Assignee: Maschinenfabrik Hennecke GmbH, Leverkusen, Fed. Rep. of Germany

[21] Appl. No.: 49,902

[22] Filed: Apr. 20, 1993

[30] Foreign Application Priority Data

Apr. 24, 1992 [DE] Fed. Rep. of Germany ....... 4213525

[51] Int. Cl.$^5$ .................................................. B01F 15/02
[52] U.S. Cl. ........................ 422/133; 239/398; 239/566; 239/600; 366/159; 366/177; 422/135; 425/131.1; 425/190; 425/192 R
[58] Field of Search ............. 422/133, 135, 136; 366/159, 177, 173; 239/600, 398, 566; 425/130, 131.1, 133.5, 190, 192 R

[56] References Cited

U.S. PATENT DOCUMENTS

| | | | |
|---|---|---|---|
| 3,263,928 | 8/1966 | Gusmer | 239/123 |
| 3,390,814 | 7/1968 | Creighton, Jr. et al. | 222/137 |
| 4,288,832 | 9/1981 | Saligny | 361/119 |
| 4,377,256 | 3/1983 | Commette et al. | 239/117 |
| 4,740,089 | 4/1988 | Fiorentini | 366/150 |
| 5,082,633 | 1/1992 | Stuper | 422/133 |

FOREIGN PATENT DOCUMENTS

| | | |
|---|---|---|
| 121342 | 10/1984 | European Pat. Off. |
| 2105320 | 2/1971 | Fed. Rep. of Germany |
| 3017950 | 11/1981 | Fed. Rep. of Germany |
| 2501080 | 9/1982 | France |

*Primary Examiner*—Robert J. Warden
*Assistant Examiner*—Krisanne M. Thornton
*Attorney, Agent, or Firm*—Joseph C. Gil

[57] ABSTRACT

In order not to have to rinse, during breaks in production, oscillating mixheads such as are used for the manufacture of free-flowing, plastic-forming reaction mixtures, an exchangeable insert part held in position by means of a clip and preferably consisting of plastic material is provided in the mixhead. The insert has a mixing chamber and an outlet channel. This insert part can be disposable or reusable.

4 Claims, 2 Drawing Sheets

MIXHEAD FOR MIXING AT LEAST TWO FREE-FLOWING REACTION COMPONENTS

BACKGROUND OF THE INVENTION

The present invention relates to a mixhead for mixing at least two plastic-forming, free-flowing reaction components. The mixhead broadly consists of a housing with feed lines and a bore passing through the housing, in which bore an insert containing a mixing chamber and an outlet channel and inlet openings is arranged exchangeably, as known from U.S. Pat. No. 3,263,928, but without ejector piston.

The so-called double conveyor belt installations for manufacturing sandwich elements with a hard foam core, and, occasionally, continuously operating block foaming installations, are equipped with mixheads which oscillate over the foam breadth and which at the same time apply a reaction mixture to a travelling substrate. Such oscillating mixheads must be as light as possible, because considerable delay and acceleration forces occur at the turning points. The larger the mass to be moved, the greater the wear on the oscillator. Such light mixheads must be rinsed, which is generally carried out with the polyol components in the manufacture of polyurethane foam for example. But this places a burden on the environment, and uses up polyol, which also has to be disposed of due to the contamination it causes. It would be preferable t use self-cleaning mixheads (U.S. Pat. No. 3,263,928, DE-A1-2,920,388, DE-A1-3,017,950), i.e. ones with ejector pistons, such as those which have been accepted in practice for foaming in situ. But these are substantially heavier and therefore not under consideration due to the increased wear they place on the oscillator.

The object of the present invention was to find a mixhead for the application indicated, which is on the one hand light, in order to keep the mass to be moved and hence the amount of wear to a minimum, and which on the other hand does not have to be rinsed when production is interrupted.

BRIEF DESCRIPTION OF THE DRAWINGS

FIG. 5 is an enlargement of circled section E in FIG. 2.

DESCRIPTION OF THE INVENTION

Figure 1:
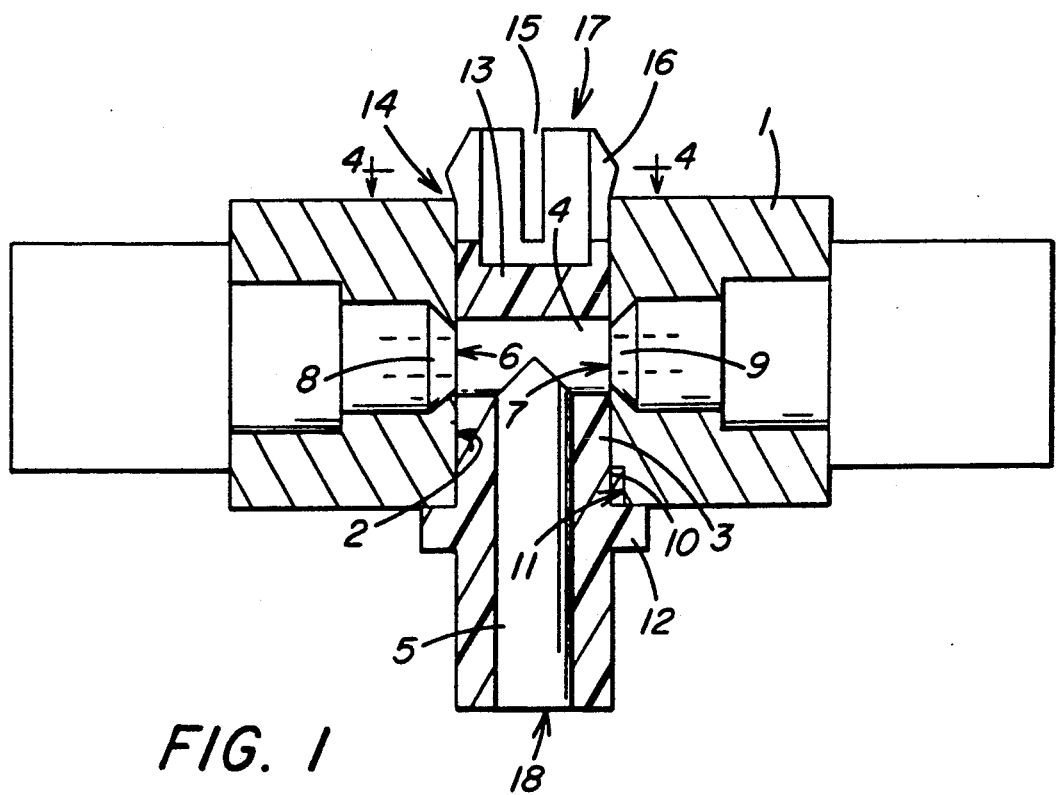
FIG. 1 shows a first embodiment of a mixhead of the present invention.

The above-noted object is achieved in that the insert has an integrated mixing chamber base and at least one elastic clip which is arranged on the other side of the mixing chamber base and interacts with the housing.

Exchangeable inserts are known to be used for mixheads with cleaning pistons. U.S. Pat. No. 3,263,928, for example, describes one such mixhead with an insert which, evidently to facilitate its manufacture and to make it easier to clean, consists of two halves. The insert is arranged in a housing cap which is screwed to an attachment. Since the feed lines enter through the housing cap, the insert cannot be rapidly exchanged. DE-A1-3,017,950 discloses an ejector piston mixhead in which an exchangeable outlet pipe is attached to the mixing chamber housing by means of a screw cap. Finally, DE-A1-2,920,388 describes an ejector piston with an insert containing the mixing chamber and the outlet channel. The insert can only be exchanged by dismantling the mixhead and it is used to cover recirculation grooves incorporated in the housing. Apart from the fact that the above prior art refers to ejector piston mixheads which are not suitable for the use according to the present invention, none of the documents suggests arranging both the outlet channel and the mixing chamber in one single insert which can be exchanged within a very short time simply by inserting or extracting it by hand.

This insert part, preferably consisting of a plastic material, can be very simply manufactured, by injection molding, for example. Obviously, it may also be made of metal, in particular aluminum, although this makes it slightly heavier. An insert part made of plastic material has the advantage, over mixheads used to date for this purpose, of being lighter, because the lighter plastic material takes the place of metal while having the same dimensions. A cheap insert part of this type can be used as a disposable article. If manufactured from a plastic material such as polyethylene or poly-tetrafluoroethylene, to which the hardening reaction mixture does not easily adhere, the insert can be reusable. Obviously the surfaces of the insert part coming into contact with the reaction mixture can also be coated with a non-stick agent.

The insert part has a tubular shape, inlet apertures for the reaction components, and centering means, which are so adapted that the inlet apertures correspond to the feeds in the housing. Such centering means may consist of a longitudinal groove in the housing bore with an associated tongue on the insert part. Thus the insert part is prevented from rotating, so that the inlet apertures and the feeds cover one another. The longitudinal positioning can be achieved by a defined length of the tongue and groove or by an outer ring extension on the insert part, which abuts the housing. There are various options for holding the insert part firmly but detachably in the housing.

Preferably, the insert part is provided with a clip. Such a clip connection may be formed by a slight increase in the depth of the groove and an increase in the height of the tongue, so that when the insert part is inserted into the housing a certain snap fit takes place. On the other side of the base of the extension part, a ring of lugs extending obliquely outwards may be provided, with slots between them. These lugs engage on the rear of the housing. It is also possible to provide in the wall of the housing bore or on the rear of the housing at least one bump, which engages in a recess in the insert part. But this part must be sufficiently resilient in the said region to deform in the necessary way when inserted in or removed from the housing bore. This type of clip fixing at the same time acts as positioning means if the position of the recess and the bump correspond to the position of the feeds.

According to a further special embodiment, the insert part consists of two half-shells braced against one another. This embodiment is particularly simple to manufacture, because an injection molding tool without a slide can be used, and it is Possible to mold on a film hinge at the same time, so that the two half-shells are joined. As a reusable insert part, this embodiment is particularly recommended, as it is possible, by opening out the half-shells, to remove the rest of the mixture contained therein very simply. The mutually facing longitudinal edges of the half-shells are advantageously provided with tongue-and groove profiling in order to give greater shape stability and a better seal. The half-shells are braced against one another on one side in the housing bore and the outlet end must be held together by a ring or tube pushed over it or by a rapid locking device.

According to a further special embodiment, the outlet section is formed as a pouring rake. A pouring rake of this type is known in the art, but has the advantage in the special embodiment that it does not have to be rinsed. This applies particularly to the embodiment consisting of two half-shells.

Preferably the outlet section is surrounded with a tempering jacket. This jacket can be molded on in an injection molding process, which is quite expensive. It is more practical to join this tempering jacket rigidly, but optionally detachably, to the housing. In the half-shell embodiment of the insert part, it can be used simultaneously as a bracing element. If the outlet section is formed as a pouring rake, the tempering jacket must leave the outlet apertures of the pouring rake free.

The drawings show, purely diagrammatically, the new mixhead in two embodiments, and will be explained in more detail below.

In FIG. 1, the mixhead consists of a housing I with a housing bore 2, in which an insert part 3 is disposed. This insert part 3 consists of a polyethylene injection-molded part and comprises a mixing chamber 4 and an outlet channel 5. The mixing chamber 4 has inlet apertures 6, 7, into which feeds 8, 9 are directed. The feed generally consist of injection nozzles for the reaction components. Rotation is prevented by a tongue 10, which engages in a groove 11 disposed in the housing bore 2. The tongue 10 and groove 11 are matched to the position of the inlet apertures 6, 7 or the feeds 8, 9. In addition, the insert part 3 has a stop ring 12 on the exterior. At the back, the insert part 3 is sealed with a base 13, which simultaneously forms the base of the mixing chamber 4. On the other side of the base, the insert part 3 is provided with a lug 16 formed as a clip 14, having slots 15 and engaging behind the housing 1. The position of the lugs 16 corresponds to the position of the stop ring 12 in order to ensure a secure fit. The extension 17 is resilient, due to the slots 15, so that the lugs 16 can deform reversibly in the required manner when the insert part 3 is inserted into and removed from the housing bore 2. The outlet channel 5 is provided with an outlet aperture 18.

Figure 2:
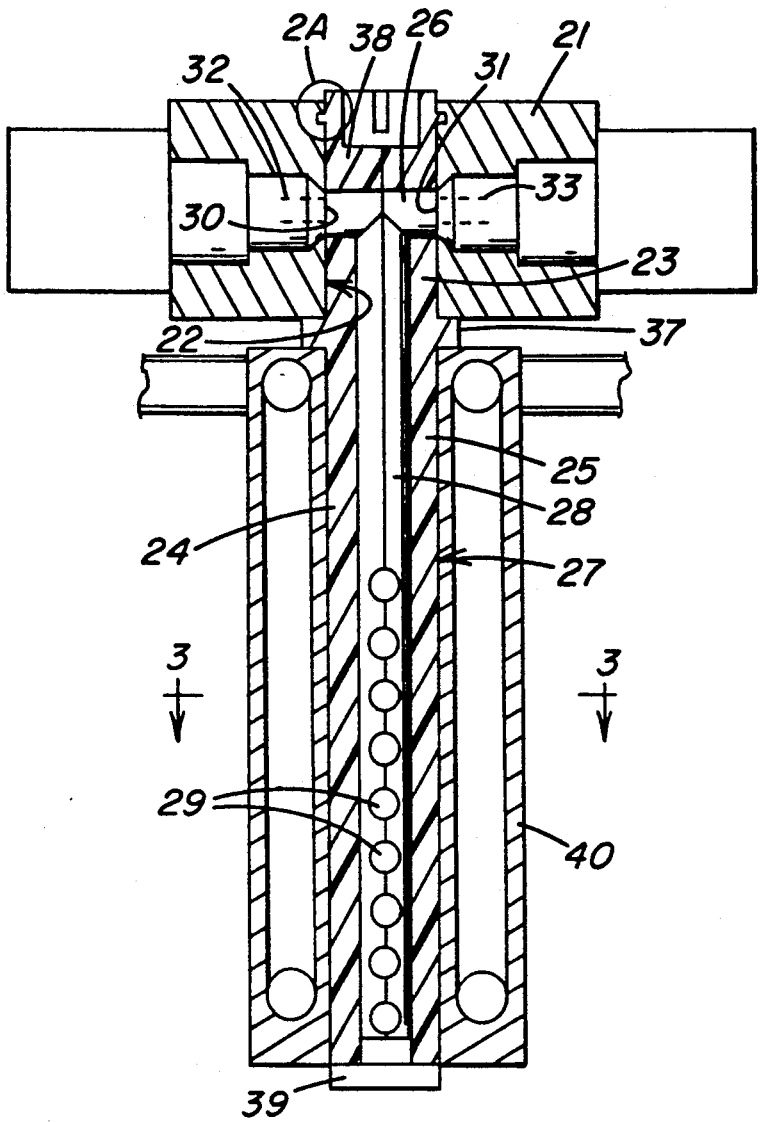
FIG. 2 shows a second embodiment.
Figure 2A:
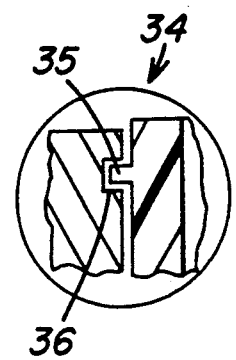
Figure 4:
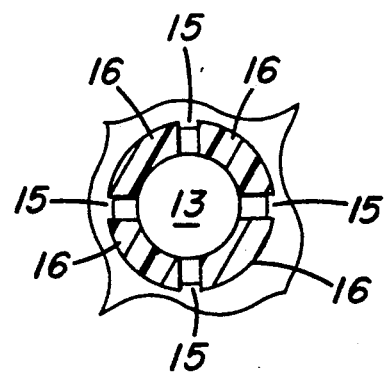
FIG. 4 is a top view of the insert of FIG. 1.
Figure 3:
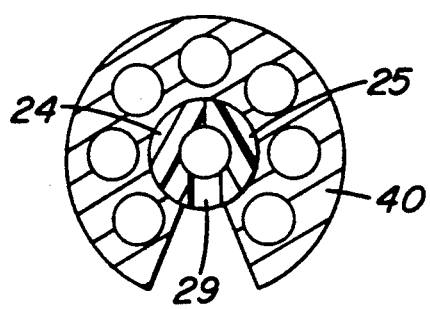
FIG. 3 is a sectional view along line A—A of FIG. 2.

In FIGS. 2 and 3, the mixhead consists of a housing 21 with a housing bore 22, in which an insert part 23 is disposed. This insert part 23 consists of two half-shells 24, 25 of polytetrafluoroethylene, and comprises a mixing chamber 26 and an outlet channel 28 located in an outlet section 27. This outlet section 27 is sealed at its end and forms a pouring rake provided with outlet apertures 29 in the longitudinal direction. The mixing chamber 26 has inlet apertures 30, 31, into which feeds 32, 33 consisting of injection nozzles for the reaction components are directed. These half-shells 24, 25 are fixed by bumps 35 and recesses 36, which cooperate as a clip 34. They fix the insert part 23 both against rotation and against longitudinal displacement. Their position corresponds to the position of the inlet apertures 30, 31 or the feeds 32, 33. In addition, a ring extension 37 is provided. Both ends of the insert part 23 are sealed by bases 38, 39. The outlet section 27 is surrounded by a tempering jacket 40, which leaves the outlet apertures 29 free but braces the two half-shells 24, 25 together.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixhead for mixing at least two plastic-forming, free-flowing reaction components, comprising i) a housing having a bore therein and inlet apertures through which said reaction components flow, and ii) an exchangeable, rigid insert part having a) inlet openings through which said reaction components flow, b) a mixing chamber in which said reaction components are mixed to form a reaction mixture and c) an outlet channel through which said mixture flows, said insert being held in position in said housing by an elastic clip, such that said apertures are aligned with said openings.

2. The mixhead of claim 1, wherein said insert part consists of two half-shells braced against one another.

3. The mixhead of claim 1, wherein said outlet channel is formed as a pouring rake.

4. The mixhead of claim 1, wherein said outlet channel is surrounded by a tempering jacket.

* * * * *